United States Patent [19]
Schug

[11] 3,796,320
[45] Mar. 12, 1974

[54] METHOD AND EQUIPMENT FOR DESALINATION OF LIQUIDS

[75] Inventor: Helmut Schug, Dusseldorf, Germany

[73] Assignee: Mannesmann Aktiengesellschaft, Dusseldorf, Germany

[22] Filed: Jan. 17, 1972

[21] Appl. No.: 218,400

Related U.S. Application Data

[63] Continuation of Ser. No. 828,951, May 29, 1969, abandoned.

[30] Foreign Application Priority Data
May 30, 1968  Germany............................ 1767623

[52] U.S. Cl.................. 210/189, 210/283, 210/291
[51] Int. Cl............................................ B01d 41/02
[58] Field of Search......................... 210/20, 33–35, 210/189, 264, 283, 291, 285

[56] References Cited
UNITED STATES PATENTS

| | | |
|---|---|---|
| 3,200,067 | 8/1965 | Levendusky.................... 210/189 X |
| 3,298,950 | 1/1967 | Mindler.......................... 210/189 X |
| 3,374,052 | 3/1968 | Fan et al......................... 210/20 X |
| 2,767,140 | 10/1956 | Fitch................................ 210/24 |
| 2,810,693 | 10/1957 | Wisfeld et al........................ 210/33 |
| 3,193,498 | 7/1965 | Platzer et al.................... 210/264 X |
| 3,312,617 | 4/1967 | Klein................................... 210/35 |
| 3,056,743 | 10/1962 | Eichhorn et al....................... 210/33 |

Primary Examiner—John Adee
Assistant Examiner—Robert H. Spitzer
Attorney, Agent, or Firm—Smyth, Roston & Pavitt

[57] ABSTRACT

Liquids are desalinated in equipment from which filter material is continuously withdrawn, regenerated and mixed with the raw, saline liquid prior to charging the filter. The regenerated filter material may circulate through a post desalinated filter prior to recycling into the principal filter.

7 Claims, 3 Drawing Figures

METHOD AND EQUIPMENT FOR DESALINATION OF LIQUIDS

This is a continuation of application Ser. No. 828,951 filed May 29, 1969 now abandoned.

The invention relates to equipment for desalination of liquids wherein the raw, saline liquid passes through a filter container, preferably in up direction, and wherein the filter container has a filling of an exchange material comprised of anion and/or cation resins.

It is known to employ exchange filters with a material providing cations or anions for softening or decarbonization, for complete or partial desalination or the like, of drinking water, of industrial water or of water used in boilers or similar type liquids. The filter material is to some extent consumed, i.e., it exhausts its capability of supplying ions, and therefore, has to be regenerated. For this purpose, cation exchangers are treated with neutral salts such as ordinary sodium chloride or with acids such as hydrochloric acid or sulfuric acid. In case the exchanger provides anions, regeneration requires the treatment, also with neutral salts, or with an alkalinic solution of a neutral salt or with base elements such as ammonia and sodium hydroxide.

Generally, the liquid to be desalinated passes through the active filter material in the filter container, such as a resin, in vertical preferably ascending direction. It is also known to pass liquid to be purified through an ion exchanger filling in a so-called whirling flow. Here the flow speed of the liquid is so large that in fact at least a portion of the active material in the filter is urged against a nozzle plate provided at or near the upper end of the filter container. The liquid to be desalinated is forced through the nozzles and withdrawn from the filter container.

In accordance with known methods, regeneration of the exhausted ion exchanger material is conducted, for example, in the same container. This is carried out in that first the supply of the saline liquid to be treated, i.e., to be desalinated, is interrupted, and a solution used for regeneration is instead passed through the filter and the ion exchange material therein, either in the same or in the opposite direction as during normal operation.

It is furthermore known to regenerate the active content of the filter container in separate equipment. In this case, again the operation is stopped occasionally and the ion exchange material is completely or partially removed from the filter container, separated into cations and anions supplying material and separately regenerated. Either the regenerated material is returned to the filter container or the latter is charged with new material and the operation is resumed.

The regeneration of the exchange material in accordance with the known methods has the disadvantage that the desalination process has to be interrupted and, therefore, is run intermittantly. During such interruption it may be necessary to switch the users of the desalinated water either to a reserve desalination plant or pure water must be stored as a reserve supply, so that the period of regeneration can be overbridged by using the reserve to make sure that operation requiring the desalinated water can proceed uninterruptedly. In any event, additional reserve storage or duplicating desalination equipment is required. These disadvantages imposed by these expenditures are to be avoided and can be avoided in accordance with the present invention.

In accordance with the invention the active ion exchange material is gradually removed from the filter container, in a continuous process without interrupting the flow of saline liquid to be desalinated. The ion exchange material which has been removed is regenerated and thereafter mixed into the raw saline liquid. That mixture is fed into the filter container from below. The flow speed must be selected to be sufficiently high so that the ion exchange material is whirled in up direction to form a packed bed.

In case the saline liquid is to be extensively desalinated it is suggested to separate the loaded ion exchange materials in the filter container during the desalination process continuously and in accordance with the different specific weight or density, which in effect separates anion from cation material. Separately they are withdrawn from the filter container, separately regenerated and the regenerated anion and cation resins are mixed again and fed back into the filter container. In case the purity requirements of the liquid are rather high, it is suggested to use a supplemental desalination filter charged with the partially desalinated liquid from the principal filter and mixed with the regenerated ion exchange material. After the latter is partially used in the supplemental desalinating filter, the ion exchange material is withdrawn from the supplemental filter and fed back to be mixed with the saline liquid to charge the principal or predesalinating filter.

The forced flow of liquid-active filter material in the supplemental filter causes the material to be flushed against, for example, the upper portion of the filter container even if the flow therein is in up direction. As the pressure level in the two filters is different, a simple feedback path from the supplementing desalinating filter to the input of the principal filter suffices to transport ion exchange resins into the loading portion of the latter filter. The method in accordance with the invention insures that liquid to be desalinated is continuously contacted by fresh, regenerated ion exchange material and exhausted material is discharged from the filter, likewise on a continuous basis, so that a continuous desalination process is not interrupted by the required regeneration. The series connection or cascading of two desalination filters permits employment of the completely fresh and regenerated ion exchange material in the final and more critical desalination stage, as the partially "used" resins are "reused" for the predesalination, which ensures economic use thereof prior to withdrawal for regeneration.

The principal or predesalinating filter is, for example, subdivided into an upper and a lower chamber. Inflow of raw saline liquid is mixed with regenerated (and eventually partially used active) ion exchange material. The latter is flushed against the divider. Partially desalinated liquid is forced through nozzles in the divider. The divider is provided in addition with small vertical tubes and a mixture of active material and liquid is forced out of the lower portion of the subdivided filter through these tubes. The heavier components of the ion exchange material passing through the small pipes precipitate and are sucked away; usually they are the cation resins, and after their removal, they are fed to the cation regenerator. The anion exchange material usually has a lower specific weight and density and is flushed up with the liquid into the upper portion of the filter container, and is sucked from there for passage into the regenerator for anion resins. Separate drainage systems below and above the nozzle plate discharge desalinated or partially desalinated liquid from the filter container.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
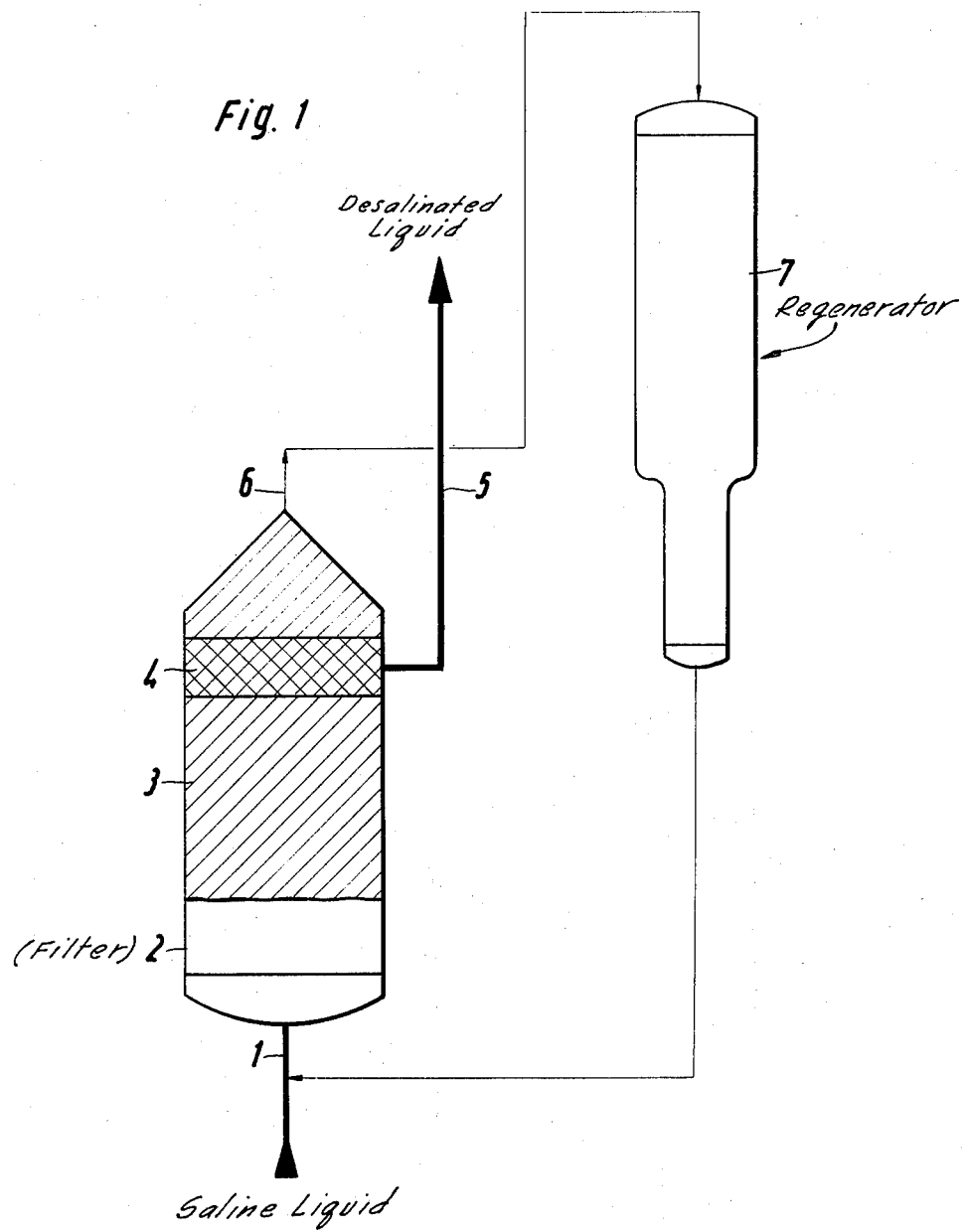
FIG. 1 illustrates schematically the circulation in a simple desalination device using one type of ion exchange material and including equipment for continuous regeneration of the active material.

Proceeding now to the detailed description of the drawings in FIG. 1 thereof, there is illustrated a desalination equipment using uniform-type ion exchange material. Raw, saline liquid to be desalinated passes through a pipe 1 into the bottom portion or feed input of a filter container 2 filled with ion exchange material 3. The flow is sufficiently forceful to flush essentially all or most of the active material 3 against the top and upper portion of container 2 which collects that material accordingly. A drainage system 4 is disposed in about the upper third portion of container 2, to withdraw the desalinated liquid from container 2 to be passed into the pipe 5.

Loaded ion exchange material is continuously removed from the upper portion of container 2 through a pipe 6 connected to the top thereof, whereby, in effect, a portion of the ion exchange material mixed with some of the desalinated liquid is withdrawn from container 2 and passed into pipe 6. The flow is sufficiently restricted to limit the rate of flow of ion exchange material out of filter container 2. This mixture of some of the ion exchange material and some of the desalinated liquid is fed through pipe or conduit system 6 into a regenerating tank 7 in which the ion exchange material is regenerated. This mixture of desalinated liquid and now regenerated ion exchange material is withdrawn from the bottom of the tank 7 and fed back into the system in that it is added to the flow of raw, saline liquid entering container 2 through the end of pipe 1. This completes the circulation of active filter material, as it is now flushed against the lower side of the ion exchange material as packed near the top. The exhausted portion thereof accumulates at the top and is collected thereat.

One can readily see that the active filter material circulates through the system. After regeneration it is flushed into filter container 2 and migrates toward the top, from which it is withdrawn. The supply rate is thus preferably dimensioned such that the material has just about exhausted its ion exchange-filtering capability when withdrawn through pipe 6 for regeneration, and the capacity of the regenerator is matched to the withdrawal rate (or the latter to the former).

The system shown in FIG. 1 operates either with an anion exchanger or with a cation exchanger. The equipment illustrated in FIG. 2 desalinates liquid by using anion exchangers, as well as cation exchangers. There is shown a filter container 20, a feeder pipe 1 leading into the bottom of the filter container, and there is a withdrawal pipe system 5. However, in about the middle of container 20 there is a nozzle plate 8, dividing the container in an upper and a lower chamber. Plate 8 has filter nozzles 9 essentially for passage of liquid only. Next there are provided several vertical pipes 10 of rather small diameter interspaced with nozzles 9 but extending in up direction well above the upper surface of plate 8 which serves as the bottom for the upper chamber. These pipes 10 serve for the removal of some ion exchange material 3 from the lower chamber of container 20, as it accumulates near the top of the lower chamber.

A suction funnel 11 is disposed below the upper, open ends of tubes 10 to suck precipitated exchange material on a continuous basis into a pipe 6a. There is a second suction device 12 provided in the upper portion of the upper chamber of container 20 for sucking therefrom residual exchange material into a pipe 6b. The filter has two drainage systems, 13 and 4, one in each chamber, respectively below funnels 11 and 12 and both feeding the output pipe 5 for the withdrawal of desalinated liquid.

Pipe 6a feeds a regenerator 14 for cation resins, pipe 6b feeds a regenerator 15 for anion resins. The outputs of regenerators 14 and 15, i.e., mixtures of desalinated liquid and of fresh active filter material, are combined with each other and added to the flow of raw, saline liquid prior to charging filter 20.

The system shown in FIG. 2 operates as follows: Raw, saline liquid to be desalinated, together with regenerated ion exchange material for filter replenishment, flows into the lower chamber of the container 20 from below and particularly at a speed of 20 to 80 meters per hour or thereabouts. The exchange material is flushed against nozzle plate 8 and is, therefor, collected thereat to form, to a considerable extent, a packed bed from below the plate. Some of the desalinated liquid is removed from the flow traversing the material 3, through the drainage system 13. As before, filter material as it is used and as it looses its capability migrates in up direction and here towards and against plate 8. A portion of the desalinated liquid passes through the filter nozzles 9 while a mixture of liquid and of some exchange material passes through pipes 10 into the upper chamber.

Exchange material and liquid entering the upper chamber of container 2 through the pipes 10 separate partially at flow speeds of 8 to 12 meters per hour. Those resins having a relative high specific weight and which usually are the cation resins, precipitate at this rather low flow speed and drop to the bottom of the upper chamber as established by the upper surface of nozzle plate 8. The funnel 11 is disposed in the vicinity thereof, below the upper openings of pipes 10, and sucks the precipitated resins into pipe 6a for passage into the regenerator 14 for cation resins. Usually, the anion resins have lesser density and specific weight and, therefore, do not separate from the liquid flushed into the upper part of the upper chamber of container 20. These resins are sucked into pipe 6b by means of funnel 12 and charge the anion regenerator 15.

The two different types of ion exchanger materials are separately regenerated in equipment 14, 15. Fresh anion exchange material from regenerator 14 is mixed with fresh cation exchange material from regenerator 15 and the mixture is added to the raw saline liquid to be desalinated and passing through pipe 1 into bottom of container 20, thereby completing the circulation of the filter material. Desalinated liquid leaves container 20 by operation of drainage systems 3 and 4 as was stated above.

Figure 2:
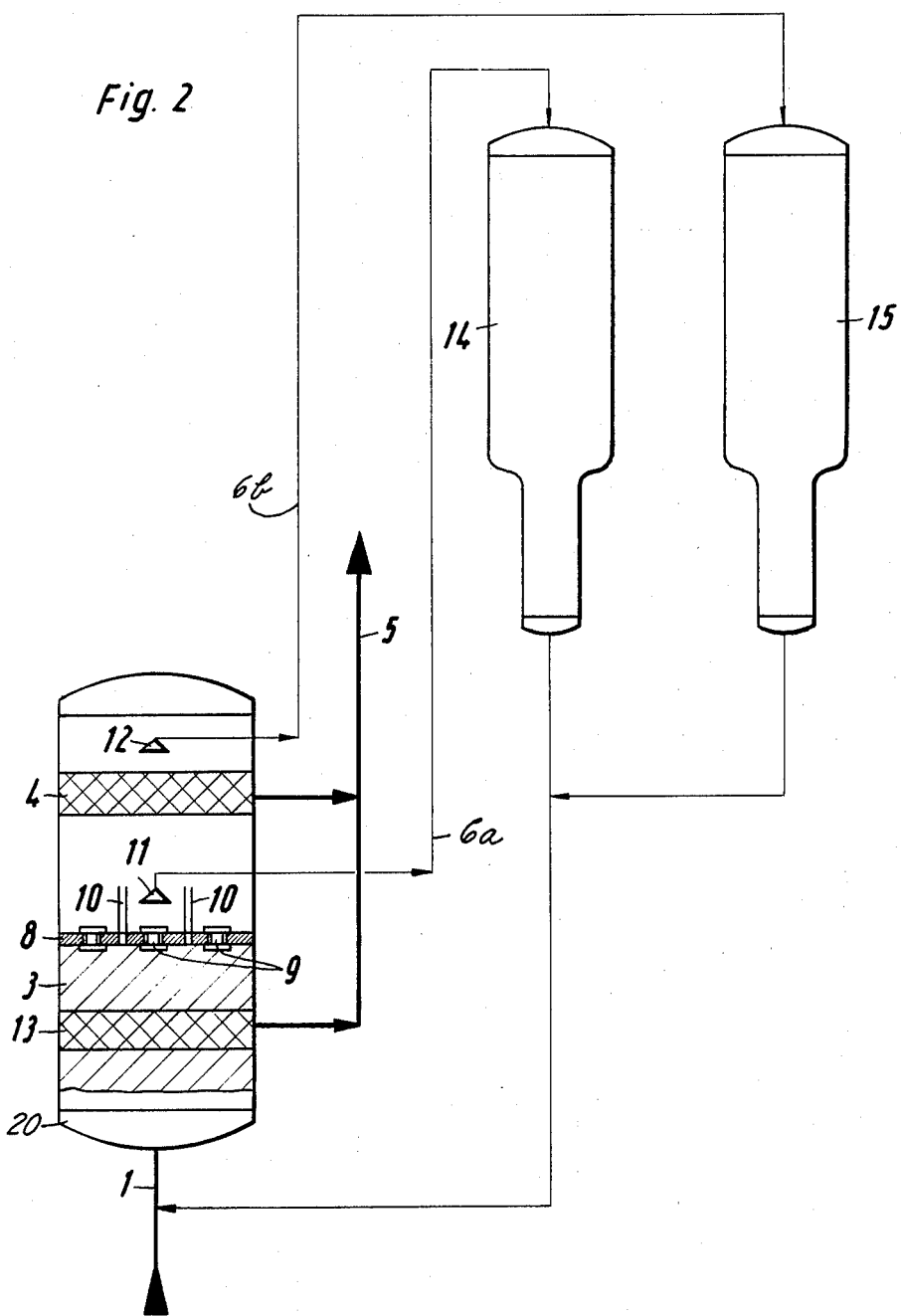
FIG. 2 illustrates equipment for desalination of liquid using anion and cation exchangers and separated regenerators, arranged to permit continuous regeneration as well as desalination.
Figure 3:
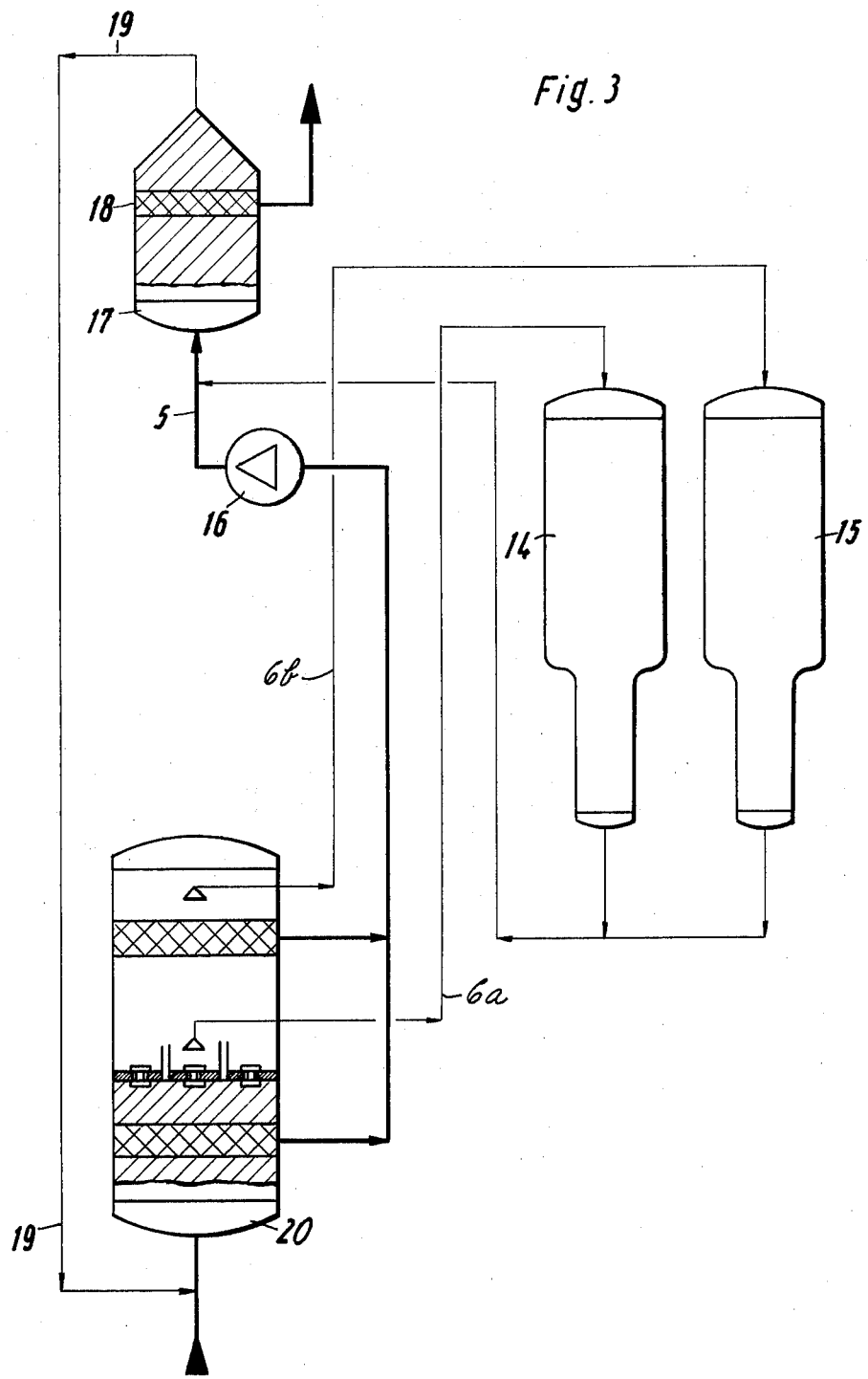
FIG. 3 shows an improvement of the system as shown in FIG. 2 with supplemental desalination and a more complex circulation of regenerated ion exchange material.

Turning now to the system illustrated in FIG. 3 this embodiment is actually an improvement of the system shown in FIG. 2. Liquid leaving the filter system, as shown in FIG. 2, may not be completely desalinated, i.e., may not satisfy more stringent requirements as to purity. Therefore, supplementing desalination is desired or even required, and the system is modified to enhance effectiveness of the filter material.

The filter 20 is constructed and operated as described above with reference to FIG. 2. However, the output conduit system 5 includes a pump 16 to increase the pressure of the partially desalinated liquid withdrawn from filter container 20. The system differs from the system shown in FIG. 2 in that the regenerated ion exchange resins as withdrawn from regenerators 14 and 15, after having been combined, are now added to the partially desalinated liquid leaving pump 16, and the mixture charges a second filter 17. The flow speed of the mixture entering filter 17 and passing therethrough is between 30 and 100 meters per hour. Again, the liquid to be finally desalinated passes through filter 17 from the bottom thereof in the up direction. However, the direction could be a reversed one. In either case, and particularly when operating at such a high speed, the exchange material is flushed against one end of filter 17 to form a packed bed thereat. The now very pure liquid is drained from filter 17 by drainage system 18 and constitutes the desalinated output of the system.

As filter 17 operates as a high purifier of a predesalinated liquid, the filter material in the filter does not exhaust its capabilities, and is still active even after having migrated to the top of container 17. Moreover, by operation of pump 16 pressure of the liquid in container 17 is higher than the pressure of the liquid in container 20. Therefore, a pipe 19 connected to the top of filter 17 permits continuous withdrawal of resin liquid mixture from filter 17 to be fed directly to pipe 1 so as to be mixed with the raw and saline liquid. This closes the loop and circulation path for the active filter material. The resins passing through the line 19 are only "slightly used" and suffice for storing predesalinate in filter 20.

It should be mentioned that in case of an upward motion of the liquid through filter 17 the withdrawal of resins occurs in the uppermost portion of the filter container 17, as illustrated. In case the flow direction is reversed, such withdrawal occurs in the lowermost point.

The above invention is not limited to the embodiments described above, but all changes and modifications thereof not constituting departures from the spirit and scope of the invention are intended to be included.

I claim:

1. Apparatus for desalination of liquid, there being regenerating means having inlet and outlet, and provided for continuous regeneration of ion exchange material, comprising:

a filter container to be filled with ion exchange material and including receiving means disposed in the bottom of the container for receiving liquid to be desalinated and feeding the liquid into the container from below, the container further including drainage means disposed above the receiving means for withdrawing at least partially desalinated liquid from the container above the location of the receiving means;

outlet connecting means for the regenerating means connecting the outlet of the regenerating means to the receiving means of the container for mixing the liquid to be desalinated with regenerated ion exchange material so that the regenerated material is carried in continuous flow into the filter container;

a barrier in the upper part of the container and in the flow path of the ion exchange material and liquid through the filter container, and disposed in the container to be effective as barrier above the drainage means of the container for accumulating ion exchange material and for forming a packed bed in the filter container below the barrier, the regenerated ion exchange material being continuously flushed against the bed from below and held by the upflow of the liquid; and inlet connecting means for the regenerating means, connecting the inlet of the regenerating means to the container above the barrier of the container for continuously withdrawing exhausted ion exchange material from the upper portion of the bed at the barrier in the filter container and passing the withdrawn material to the regenerating means thereby forming a closed loop flow path for ion exchange material as withdrawn from the filter container above drainage of desalinated liquid therefrom, such ion exchange material passing through the regenerating means and returning to the filter container together with the liquid to be desalinated in up direction and through the filter container.

2. Apparatus as set forth in claim 1, the regenerating means including a first regenerator for anion material and a second regenerator for cation material; and separating means included in the filter container for separating anion and cation material; the filter container having two separate drainage points, one being above and the other being below said barrier the inlet connecting means connected at two separate points respectively above said drainage points of the filter container for establishing separate flow loops for anion exchange and cation exchange material respectively through the first and second regenerator, the means in the filter container disposed below the means for separating, the means constructed for forming a perforated barrier against which the packed bed is formed from below.

3. Apparatus as set forth in claim 2, and including means (a) in the container to cause precipitation of the heavier one of the two types of ion exchange material from a whirling flow of liquid as passing through a portion of the container, means (b) disposed in the container for withdrawing the precipitated material, and means (c) connected to the container to cause withdrawal of the lighter one of the two types of ion exchange material in flow regions outside of the region of precipitation of the heavier material.

4. Apparatus as set forth in claim 1, a supplemental desalination filter included in said closed loop flow path, and being passed through by the liquid as withdrawn from the container by the drainage means, regenerated ion exchange material from the outlet means for the regenerating means also being charged into the supplemental filter from below, and means for withdrawing ion exchange material from the supplemental filter from above and charged into the liquid flow through the receiving means.

5. Apparatus as set forth in claim 4, there being a liquid pump interposed between the drainage means and the supplemental filter.

6. Apparatus as set forth in claim 1, the filter container being partitioned into a first and second chamber, the mixture of liquid to be desalinated and regenerated ion exchange material entering the first chamber and being flushed against the partition, desalinated liquid mixed with exchange material entering the second chamber at a flow speed permitting gravitational separation between liquid and at least some of the exchange material entering the second chamber.

7. Apparatus as set forth in claim 1, the collecting means being a horizontal plate in the container and extending transverse to the up flow of liquid in the container and partitioning in the filter container to form upper and lower chambers;

the plate having first apertures permitting the passage of liquid from the lower to the upper chamber, the plate having second apertures and vertical tubes in communication therewith and extending into the upper chamber for passage of liquid mixed with ion exchange material, relatively heavy components of the exchange material passing through the tube and precipitating onto the top of the plate;

additional means included in the closed loop flow path and disposed in relation to the inlet connecting means, for sucking precipitated ion exchange material from the top of the container;

separating means included in the closed loop flow path for separating ion material which did not precipitate from the liquid in the upper portion of the upper chamber; and means included in the closed loop flow path and connected to the additional means and to the separating means for separately regenerating the ion exchange material as removed from the filter container by operation of the additional means and the separating means.

* * * * *